Figure 1:
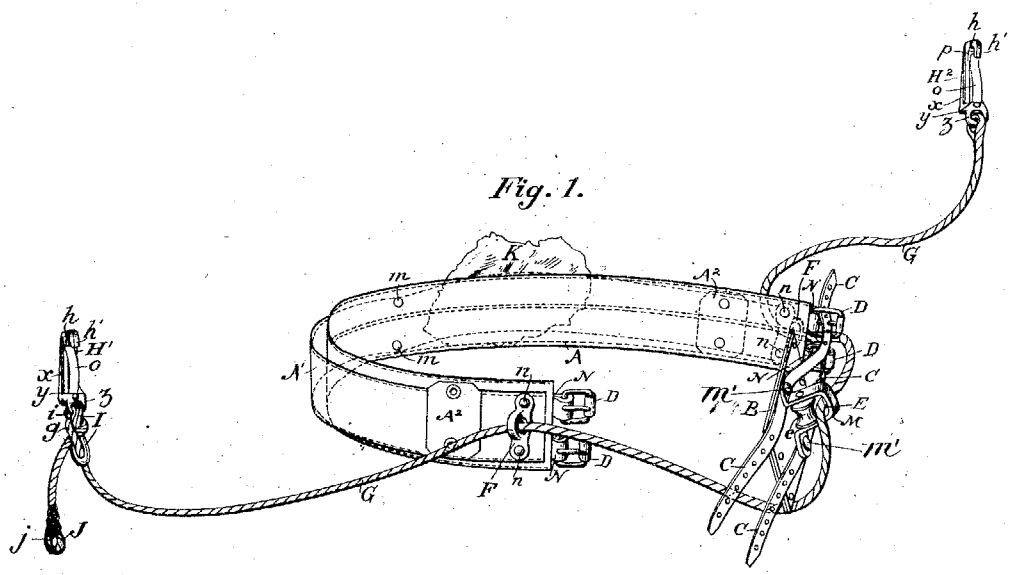

No. 12,146. REISSUED AUG. 11, 1903.

H. K. WHITNER.

SAFETY SUPPORT FOR WINDOW CLEANERS.

APPLICATION FILED DEC. 26, 1902.

2 SHEETS—SHEET 1.

Witnesses
Edward S. Berrall.
Louis Davis.

Hiram K. Whitner Inventor
By his Attorney James A. Stilton

No. 12,146. REISSUED AUG. 11, 1903.

H. K. WHITNER.

SAFETY SUPPORT FOR WINDOW CLEANERS.

APPLICATION FILED DEC. 26, 1902.

2 SHEETS—SHEET 2.

Witnesses:
Edward S. Berrall.
Louis Davis.

Hiram K. Whitner Inventor,
By his Attorney James A. Stilton

No. 12,146. Reissued August 11, 1903.

UNITED STATES PATENT OFFICE.

HIRAM K. WHITNER, OF CHICAGO, ILLINOIS.

SAFETY-SUPPORT FOR WINDOW-CLEANERS.

SPECIFICATION forming part of Reissued Letters Patent No. 12,146, dated August 11, 1903

Original No. 559,472, dated May 5, 1896. Application for reissue filed December 26, 1902. Serial No. 136,597.

*To all whom it may concern:*

Be it known that I, HIRAM K. WHITNER, a citizen of the United States, residing at Chicago, in the county of Cook and State of Illinois, have invented certain new and useful Improvements in Safety-Supports for Window-Cleaners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in safety-supports for window-cleaners and like hazardous occupations in elevated positions.

The object of my invention is to not only support the window-cleaners more securely than heretofore, but by means herein shown I greatly expedite the work done in exposed positions and make said device more durable. The belts or jackets heretofore worn by window-cleaners were fastened upon the body of the wearer by means of buckles or lacing-cords so placed that whenever said window-cleaner lost his footing the entire strain was thrown upon said fastening, the weakest portion of the apparatus. Again, the means of adjustment heretofore used in adapting said apparatus to various widths of windows was by means of buckles in connection with leather strap-stays, a means too fragile to give a full measure of safety. Knots in ropes used as stays draw tight and are not readily undone. Clamping arrangements double the stay along its length and limit the lateral movements of the window-cleaner from side to side. Furthermore, heretofore no provision has been made in said apparatus to reduce the chafing of the stay to a minimum.

In my Patent No. 474,586, dated May 10, 1892, I made the stayway (ropeway) in one section through the body of the jacket. In Patent No. 519,365, dated May 8, 1894, I show two smooth aluminium-bronze stay-eyes, (rope-eyes.) This I found to be a decided improvement. I now hereinafter show how to bring this feature to a minimum of wear and tear by using a combination of forms designated "terrets" in constructing my improved stayway.

In Patent No. 519,365, issued to me May 8, 1894, I show a new method of fastening the stay of said safety-jacket to the so-called "permanent" fixture (the four bolts placed in each window, two on a side.) To this device I add a spring stop-guard that also acts as a toe-guard and, furthermore, acts as a hook that will securely suspend the stay-terminals from the articles worn by the window-cleaner in going from window to window.

My invention consists in a safety-support of novel construction having a sling or belt or belt-sling to be worn upon the body, an adjusting-hitch for the rope, (stay,) a yoke holding in place an antifriction-wheel and forming one of the several sections of the stayway hereinafter more particularly set forth, and an improved terminal for said stay.

Figure 2:
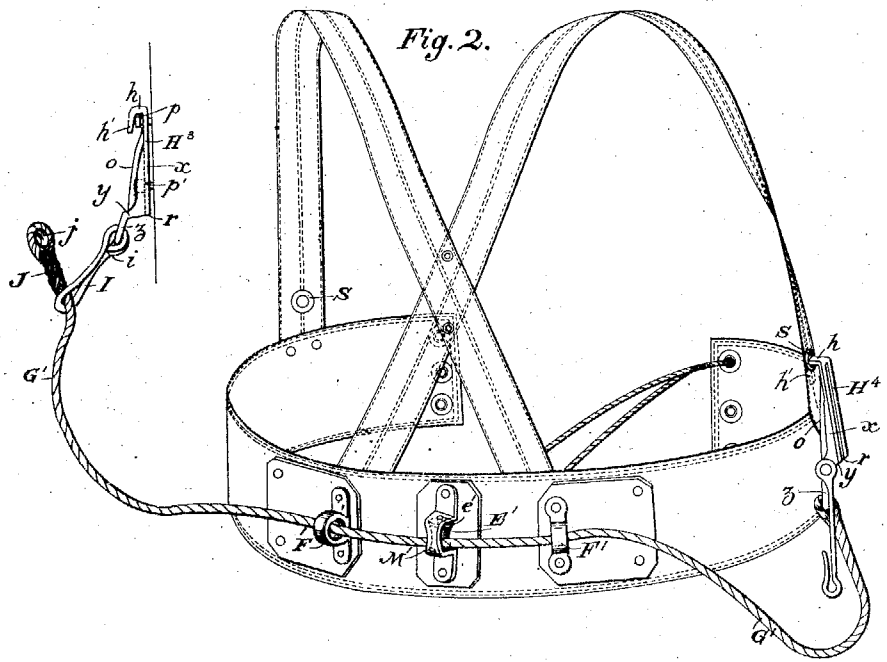

Figure 1 is a view in perspective, showing in detail my improvements and embodying my invention as I preferably construct and use it. Fig. 2 is also a view in perspective, showing modifications of my invention.

In Fig. 1, A represents an inner canvas strip folded sidewise and stitched to a width of about four inches and about twenty-eight inches long. Into the ends, between the folds of canvas, I insert the buckle-pieces N N N N to the buckles D D D D. Said buckle-pieces are held in position by the rivets *n n n n*. Said rivets also secure the terrets F F, which are shown attached near the ends of the canvas portion of my improved belt.

A′ is an outer canvas strip, also folded and sewed, somewhat narrower than A, but about an inch longer, so that when held by the rivets shown in Fig. 1 said inner and outer strips of canvas will form retaining-spaces between them, into which cloths, &c., may be thrust, as at K.

$A^2$ and $A^2$ are stiff belt-leather shields riveted to the canvas portion, the function of which is to keep the stay from chafing the canvas of my improved belt, which part I have now fully described in detail, and which constitutes the front or belly part of said apparatus when worn upon the person of a window-cleaner.

B is a pad, preferably made of several pieces of stout leather, to which the yoke M, carrying the antifriction-wheel *e*, is so adjusted as to have the stay rove through the opening E the equivalent of a stay-eye or terret. Rivets $m'$ $m'$ hold the billets C C C C securely. Said billets are adapted to engage with the above-referred-to buckles D D D D. Two of said billets are shown detached from their corresponding buckles. It would not be a departure from the principle of my invention to make said belts less adjustable by omitting the buckling feature that is shown in a buckled state. This portion of the apparatus could be made fixed when the device is fitted to the body of a person whose girth is known, thereby obviating the use of the intermediate terret E, Fig. 1. Where the ends of the canvas portion of my belt-sling approximate each other over the spine, there is less liability to chafing the clothing by the stay G, which is rove through the terret F F, placed upon the ends of the canvas or belly portion. It would not be a departure from the principles of my invention to have the terrets F F provided with antifriction-wheels, nor would it be a departure from the principles of my invention to use a simple stay-eye having smooth bearings for said stay as an intermediate terret.

I have hereinbefore referred to my belt as being a sling or belt or belt-sling. It will be obvious that the stay G G in engagement with the two stayway-sections and the terrets F and F forms an unbroken circuit into which the body of the window-cleaner should be placed. Should the window-cleaner lose his footing while encompassed by said improved apparatus and with its stay-terminals attached to their permanent fixtures, it is obvious that he would be held as in a sling and prevented from falling, because said F and F sections of the stayway would be drawn toward each other (in the direction of the spine) by a sort of slip-noose action in proportion to the weight thrown into said apparatus, and, furthermore, the billets and buckles, because of their intermediate position, instead of sustaining the load precipitated upon said apparatus would be materially relieved of strain. While at work with the body of window-cleaner resting against said stay, said billets and buckles have a function to perform. They keep said apparatus in position about the body of the window-cleaner. One of the functions of a terret placed intermediate between F and F is to protect the clothing from being chafed. It would not be a departure from the principle of my invention to place said yoke M, provided with an antifriction-wheel $e$, upon the body of the belt or jacket, and there flanking it on either side by a stay-eye F and F, as shown in Fig. 2, and bring the buckle or lacing parts to the front of the person wearing it. This would be using said antifriction device in a similar manner in a different location on the belt or jacket for the same purpose. I deem it necessary that said antifriction device be flanked on each side by the stay-eye or terret having a smooth bearing-surface on the side toward the terminal of the stay rove through said terret, such as presents a smooth wearing-surface to the stay, no matter what position may be assumed by the window-cleaner, substantially as shown. To have the stay run over the sharp edges of the wheel while the cleaner is in a stooping attitude without smooth lateral bearings would be harmful to the stay. Attached to one of said stay-terminals, intermediate between said stay-terminal H', Fig. 1, and the stay G, I show an improved stay-holder linked to the stay-terminal eye $z$. The body I has an elongated piercing through which the stay G passes, the end of the latter having an enlargement J by virtue of its splice inclosing the thimble $j$, which prevents the escape of the stay from said elongated piercing. The part $g$ of said stay is passed under said stay-holder I, where it abuts against the under part $i$ of the link-eye of said stay-holder. Said stay is now carried upon the opposite side of the contracted body of the stay-holder. The free end J is now passed under the part of the stay between the elongated piercing and the part designated $g$. It is obvious the greater the strain put upon the stay proper the greater will be the bite or hold of the intertwined stay about the narrow neck of the stay-holder, thereby forming a safe and strong adjustable hitch by which to adapt the stay G to windows of different widths.

In Figs. 1 and 2 I show terminals $H'$ $H^2$ $H^3$ $H^4$, consisting of a slotted plate $x$, provided with a longitudinal slot having an outlet at the heel. Here said outlet is spanned or bridged by a bench-form extension $y$, to which is fixed the spring $o$. This forms the subject of my Patent No. 519,365 and is adapted to engage with solid-headed lag-screws $p$ $p'$, inserted in the window-frame, as shown in Fig. 2, $H^3$. To this device I now add a toe extension $h$, turned back over the toe end of said slot, forming a stop-guard having a free point $h'$. Several functions arise from the proper construction of this extension. When of a height relative to the thickness of the head of the lag-screw $p$, (the so-called "permanent" fixture,) it acts as a toe-guard, and said slotted plate is prevented from making contact upon the adjacent woodwork, as shown in Fig. 2, $H^3$. When of a length to overhang the head of the lag-screw in engagement with the toe end of said slot, said point $h'$ acts as a stop-guard to spring $o$, preventing undue strain upon the tension of said spring, as shown in Fig. 1, $H^2$, and when properly pointed said point $h'$ becomes a hook for suspending the terminal with its attached stay upon the articles worn by the window-cleaner in going from window to window, as in gromet $s$, as shown in Fig. 2, $H^1$.

Having fully shown and described the purposes of my invention, I will now in claims point out what I wish to secure by Letters Patent of the United States—

1. In a safety-support for window-cleaners, the combination, with a stay and its terminals, of a terret fixed upon each end of a belt and adapted to engage with said stay, thereby spanning the space between the ends of the belt and means to connect said ends thereby securing said belt about said person substantially as and for the purpose set forth.

2. In a safety-support for window-cleaners, the combination, with a stay and its terminals, of a terret fixed upon each end of a belt, adapted to hold said stay in free engagement, thereby spanning the space between the ends of said belt; an intermediate terret mounted upon means to connect said end thereby securing said belt about the body of a window-cleaner and adapted to hold the spanning portion of said stay from making contact with the clothing of the wearer substantially as and for the purpose set forth.

3. In a safety-support for window-cleaners, the combination, with a stay and its terminals, of a stayway having a yoke provided with an antifriction-wheel interposed between two fixed sections in relative positions upon a jacket, and means for securing said jacket about the body of the window-cleaner, substantially as and for the purpose set forth.

4. In a safety-support for window-cleaners, the combination, with a stay and its terminals, of a terret fixed upon each end of a belt, adapted to hold in free engagement said stay, thereby spanning the space between the ends of the belt; an intermediate terret consisting of a yoke M, provided with antifriction-wheel *e*, mounted upon means to connect the ends of said belt, thereby encompassing the body of a window-cleaner, and adapted to reduce the chafing of and by said stay substantially as and for the purpose set forth.

5. In a safety-support for window-cleaners, the combination, a terret fixed upon each end of a belt and a buckle fixed upon each end of said belt, and a billet adapted to engage with each of said buckles, and adapted to hold adjustably an intermediate terret, thereby connecting the ends of said belt; a stay adapted to be rove through said terrets, thereby spanning the open space between the ends of said belt, substantially as and for the purpose set forth.

6. In a safety-support for window-cleaners, the combination, with a stay G having the enlargement J, of a stay-holder, consisting of a pierced body I, adapted to have the stay G, entwined about its contracted body, whereby a self-sustaining hitch is formed the link-eye *i* adapted to link into a stay-terminal eye, substantially as and for the purpose set forth.

7. In a safety-support for window-cleaners, the combination, with a stay and its terminals, of a stayway consisting of stay-eyes F, F and E, fixed upon belt A, and pad B; the buckles D, D, D, D, and the billets C, C, C, C, substantially as and for the purpose set forth.

8. In a safety-support for window-cleaners, the combination, with a stay and its terminals, of a stayway consisting of the stay-eye E, fixed upon pad B, attached to billets C, C, C, C; and the stay-eyes F, F, fixed upon the ends of a belt consisting of the body A and A′, provided with a space K, between them; buckles D, D, D, D, having buckle-pieces N, N, N, N; shields $A^2$ $A^2$ substantially as and for the purpose set forth.

9. In a safety-support for window-cleaners, the combination, with a stay sliding freely in a stayway, of a stay-terminal, consisting of a slotted plate *x*, provided with an extension *h*, *h′*, an extension *y*; a spring *o*, having its fixed end attached to the extension *y*, and its free end projected underneath said extension *h*, *h′*, whereby the movements of said spring are limited, substantially as and for the purpose set forth.

10. In a safety-support for window-cleaners, the combination, the solid-headed lag-screws *p*, *p′*; the terminal consisting of a slotted plate *x*, having an extension *h*, *h′*, in relative position with the lag-screw *p*; whereby said terminal is prevented from making contact with and wear upon the woodwork adjacent thereto substantially as and for the purpose set forth.

11. In a safety-support for window-cleaners, the combination, the stay G, G, having the enlargement J; terminal H′, having the stop-guard *h* and *h′*; the belt-sling consisting of the body A and A′, provided with the space K, between them; the terrets F, F, fixed upon the ends of the body A, A′; the yoke M, provided with an antifriction-wheel *e*, and attached to the pad B, and billets C, C, C, C, by means of the rivets *m′*, *m′*; the buckle-pieces N, N, N, N; the buckles D, D, D, D, adapted to connect the ends of said belt, thereby affording a means for securing said belt about the person of a window-cleaner, the shields $A^2$ and $A^2$; the stay-holder I, substantially as and for the purpose set forth.

12. In a safety apparatus, the combination of elements consisting of a protruding-headed bolt-fixture and a portable terminal provided with a slot for the shank of the bolt and also with an extension-back over the toe end of the slot so as to make contact with the head of the bolt when in position and maintain or keep the terminal at the head of the bolt, substantially as shown and described.

13. In a safety apparatus, the combination of elements consisting of a protruding-headed bolt-fixture and a portable terminal provided with a slot for the shank of the bolt and also with an extension-back over the toe end of the slot so as to make contact with the head of the bolt when in position, and means that will block the passage and accidental escape of the bolt from the terminal while permitting the terminal to swing on the bolt-head, substantially as shown and described.

HIRAM K. WHITNER.

Witnesses:
HATTIE B. LEHMAN,
LOUIS T. MANN.